US008712914B2

(12) United States Patent
Lyons et al.

(10) Patent No.: US 8,712,914 B2
(45) Date of Patent: Apr. 29, 2014

(54) METHOD AND SYSTEM FOR FACILITATING MICROPAYMENTS IN A FINANCIAL TRANSACTION SYSTEM

(71) Applicant: MasterCard International Incorporated, Purchase, NY (US)

(72) Inventors: Garry Lyons, Dublin (IE); Oran Cummins, Dublin (IE); Donghao Huang, Punggol Field (SG)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/741,241

(22) Filed: Jan. 14, 2013

(65) Prior Publication Data

US 2013/0226801 A1    Aug. 29, 2013

Related U.S. Application Data

(60) Provisional application No. 61/602,451, filed on Feb. 23, 2012.

(51) Int. Cl.
*G06Q 20/40* (2012.01)
(52) U.S. Cl.
USPC .............................................. 705/44; 705/30
(58) Field of Classification Search
USPC ...................................................... 705/10–44
See application file for complete search history.

(56) References Cited

U.S. PATENT DOCUMENTS

| 6,138,107 | A * | 10/2000 | Elgamal ........................... 705/39 |
| 6,363,363 | B1 * | 3/2002 | Haller et al. .................... 705/40 |
| 7,502,760 | B1 * | 3/2009 | Gupta ............................. 705/66 |
| 7,747,523 | B2 * | 6/2010 | Cohen ............................. 705/39 |
| 8,160,933 | B2 * | 4/2012 | Nguyen et al. ............. 705/26.35 |
| 8,249,985 | B2 * | 8/2012 | Giordano et al. ............... 705/39 |
| 8,266,068 | B1 * | 9/2012 | Foss et al. ..................... 705/321 |

(Continued)

FOREIGN PATENT DOCUMENTS

| KR | 10-2006-0060521 A | 6/2006 |
| WO | 2007-029123 A2 | 3/2007 |

OTHER PUBLICATIONS

Notification of Transmittal of the International Search Report and the Written Opinion of the International Searching Authority, or the Declaration (PCT/ISA/220), PCT International Search Report (PCT/ISA/210) and Written Opinion of the International Searching Authority (Form PCT/ISA/237) issued on May 15, 2013, in the corresponding International Application No. PCT/US2013/022681. (9 pages).

*Primary Examiner* — Frantzy Poinvil
(74) *Attorney, Agent, or Firm* — Buchanan Ingersoll & Rooney PC

(57) ABSTRACT

A system for processing accounts includes a database configured to store a plurality of accounts, the accounts including a consumer account associated with a consumer and a plurality of merchant accounts including a transacting merchant account associated with a merchant, wherein at least one account includes an amount of a virtual currency associated with the account. The system further includes a processor configured to process a financial transaction, wherein the transaction includes the consumer and the merchant, is for a specified amount of virtual currency, and processing the transaction includes transferring the specified amount of virtual currency from the consumer account to the transacting merchant account. The processor is further configured to process the at least one account, wherein processing the at least one account includes converting the associated amount of virtual currency to or from a real currency when the at least one account meets a predetermined criteria.

22 Claims, 13 Drawing Sheets

(56) References Cited

U.S. PATENT DOCUMENTS

| | | | |
|---|---|---|---|
| 8,335,745 B2 * | 12/2012 | Perlman et al. | 705/67 |
| 8,364,556 B2 * | 1/2013 | Nguyen et al. | 705/26.35 |
| 8,489,483 B1 * | 7/2013 | Gillin et al. | 705/35 |
| 8,560,452 B2 * | 10/2013 | Lynch et al. | 705/43 |
| 8,595,083 B2 * | 11/2013 | O'Leary et al. | 705/26.1 |
| 2010/0223187 A1 | 9/2010 | Fujita et al. | |
| 2011/0276476 A1 | 11/2011 | Kim | |
| 2012/0022981 A1 | 1/2012 | Morgenstern et al. | |

\* cited by examiner

METHOD AND SYSTEM FOR FACILITATING MICROPAYMENTS IN A FINANCIAL TRANSACTION SYSTEM

FIELD

The present disclosure relates to technical solutions for providing virtual currency micropayments, particularly as applied in a financial transaction system, specifically utilizing a universal virtual currency in order to minimize processing fees and times while facilitating micropayments.

BACKGROUND

In traditional financial transactions, consumers often used cash or personal checks in order to pay merchants for goods or services. Over time, credit cards and other types of payment cards gained mainstream use. However, using a payment card may require the consumer, merchant, or both to pay a processing fee to a payment processor for processing payment across traditional payment network process paths, i.e., payment rails. Because of the existence of processing fees, some merchants set a minimum transaction amount that is required when a payment card is used. Merchants might accumulate small charges over a period of time, but it is not uncommon for the accumulated amount to still be small and the transaction fees erode the value of the transaction for the party paying the fees.

At the same time, consumers are entering more and more financial transactions with merchants for smaller and smaller amounts. These micropayment transactions will at times be for a payment amount that is small and even less than the costs of processing the transaction, such as transactions for things like digital music and other content that might be worth less than a dollar or even pennies. This can result in a higher expense to the consumer, higher costs for the merchant, loss of revenue to payment processors, or others depending on the circumstances. Some merchants have taken to using an alternative currency for transactions for their own transactions, and exchanging the alternative currency with real currency in commercially acceptable amounts, as to minimize processing costs. For instance, a consumer might buy a certain number of points (e.g., Microsoft Points™) or virtual currency (e.g., Linden Dollars™) for a set number of real dollars, with the points or virtual currency being available for purchases associated with the merchant or being limited to a particular merchant or merchant family or association (e.g., Discover Coins),. This is a form of prepayment.

However, such systems often leave a consumer with residual alternative currency that they will not use. In addition, multiple merchants with unique alternative currencies can be confusing and hard to manage for consumers, who must be aware of different exchange rates, values, purchase denominations, amount they have prepurchased, and more. Further, if a consumer utilizes multiple alternative currencies, residual amounts of each currency can compound into a large monetary loss for the consumer. Thus, a demand exists for a technical solution to the problems presented by the commercial need for making virtual currency, and in particular, micropayments available at an acceptable cost, particularly one accepted across multiple merchants. Further, the conversion between virtual currency and real currency is problematic, requiring specific software that is generally specific to a merchant, merchant family, or association. What is perceived to be needed is a technical solution so that virtual currency can be used across broad segments of the world economy by a central and/or worldwide recognized entity to make it a cross-border, universal, or worldwide universal virtual currency.

SUMMARY

The present disclosure provides a description of methods and systems for processing financial accounts. More specifically, for methods and systems for processing financial accounts that include facilitating micropayments that utilize a universal virtual currency for processing financial transactions between a consumer and multiple merchants.

A system for processing financial accounts includes a database configured to store a plurality of accounts, the plurality of accounts including a consumer account associated with a consumer and a plurality of merchant accounts including a transacting merchant account associated with a merchant, wherein the consumer account and the transacting merchant account each include an amount of virtual currency associated with the account. The system further includes a receiving device configured to receive a transaction request for a financial transaction between the consumer and the merchant, where the transaction request including the consumer account, the merchant account, and a transaction amount of virtual currency. The system also includes a processor configured to: approve or deny the transaction request based on at least the amount of virtual currency associated with the consumer account and the transaction amount of virtual currency; transfer the transaction amount of virtual currency from the consumer account to the merchant account upon approval of the transaction; and process the consumer account or the merchant account, wherein the processing includes converting at least part of the associated amount of virtual currency into a real currency when the accounts meets a predetermined criteria. The system further includes a transmitting device configured to transmit the approval or denial of the transaction request.

A method for processing financial accounts includes storing, in a database, a plurality of accounts, the plurality of accounts including a consumer account associated with a consumer and a plurality of merchant accounts including a transacting merchant account associated with a merchant, wherein the consumer account and the transacting merchant account each include an amount of virtual currency associated with the account. The method further includes receiving a transaction request for a financial transaction between the consumer and the merchant, where the transaction request including the consumer account, the merchant account, and a transaction amount of virtual currency, and approving or denying the transaction request based on at least the amount of virtual currency associated with the consumer account and the transaction amount of virtual currency. The method also includes transferring the transaction amount of virtual currency from the consumer account to the merchant account upon approval of the transaction, processing the consumer account or the merchant account, wherein the processing includes converting at least part of the associated amount of virtual currency into a real currency when the accounts meets a predetermined criteria, and transmitting the approval or denial of the transaction request.

A system for processing financial transactions includes a receiver configured to receive a transaction request for a financial transaction where the transaction request includes at least information associated with a consumer, information associated with a merchant, and a transaction amount, and a database configured to store account information including consumer account information corresponding to the consumer and merchant account information corresponding to the merchant, each account information including an associated value of a universal virtual currency, the universal virtual currency being able to be exchanged for a real currency. The system also includes a database configured to store at least one processing rule defining rules or guidelines for how to process the financial transaction and a processor configured to process the financial transaction in accordance with the at least one processing rule, wherein processing the financial transaction includes adjusting the associated value of universal virtual currency in the consumer account information and the merchant account information based on the transaction amount. The system further includes a transmitting component configured to transmit a response to the transaction request, the response including at least a notification of success or failure of the processing of the financial transaction.

A method of processing financial transactions includes a receiving a transaction request for a financial transaction where the transaction request includes at least information associated with a consumer, information associated with a merchant, and a transaction amount, and storing, in a database, account information including consumer account information corresponding to the consumer and merchant account information corresponding to the merchant, each account information including an associated value of a universal virtual currency, the universal virtual currency being able to be exchanged for a real currency. The method also includes retrieving, from a plurality of processing rules, at least one processing rule defining rules or guidelines for how to process the financial transaction and processing, by a processor, the financial transaction in accordance with the at least one processing rule, wherein processing the financial transaction includes adjusting the associated value of universal virtual currency in the consumer account information and the merchant account information based on the transaction amount. The method further includes transmitting a response to the transaction request, the response including at least a notification of success or failure of the processing of the financial transaction.

BRIEF DESCRIPTION OF THE DRAWING FIGURES

Exemplary embodiments are best understood from the following detailed description when read in conjunction with the accompanying drawings. It is emphasized that, these are exemplary embodiments, to which the claimed invention is not limited. Included in the drawings are the following figures:

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Legacy Payment Card Transaction System

Figure 1:
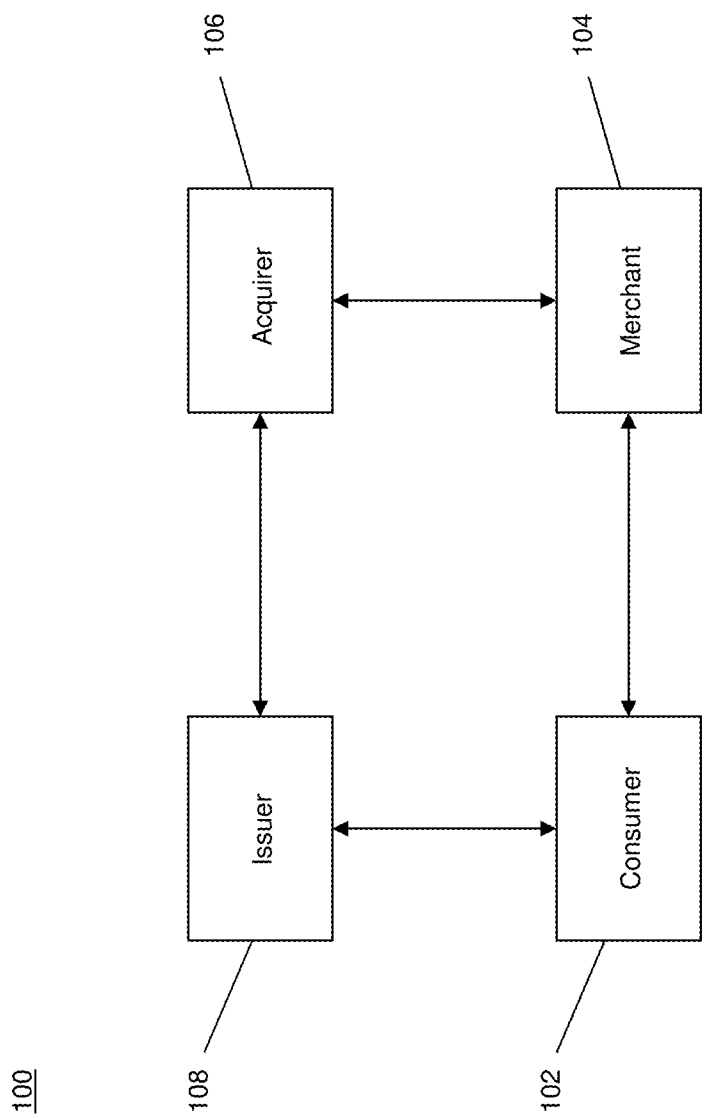
FIG. 1 is a block diagram illustrating a system for facilitating payment card transactions in accordance with exemplary embodiments.

FIG. 1 is a block diagram illustrating a system 100 for processing payment card transactions. A consumer 102 may engage in a financial transaction (e.g., a transaction for the purchase of goods or services) with a merchant 104. The transaction may occur at a physical location of the merchant 104, or may be performed remotely, such as through the Internet, over telephone, by mail order, or by any other method suitable for financial transactions.

The consumer 102 may use a payment card in order to facilitate payment for the financial transaction. The payment card may be any type of transaction card used for making payments in a financial transaction, such as a debit card, credit card, charge card, ATM card, etc. Each payment card may be assigned a unique identifier (e.g., an account number) that links the payment card to the cardholder (e.g., the consumer 102).

The payment card may be issued to the consumer 102 by an issuer 108, such as a bank. The issuer 108 may assign the consumer 102 a unique identifier (e.g., an account number). The consumer 102 may have multiple payment cards issued by the issuer or issuers 108, or may have other financial accounts (e.g., checking accounts, savings accounts, etc. (collectively known as funding sources)). Each of the payment cards or financial accounts may be associated with the unique identifier assigned to the consumer 102.

The merchant 104 may provide transaction information (e.g., payment card information, transaction amount, etc.) for the financial transaction to an acquirer 106, such as the merchant's bank. The acquirer 106 may communicate with the issuer 108 to process the financial transaction. The acquirer 106 may submit an authorization request to the issuer 108 that issued the payment card used in the transaction (e.g., the cardholder's bank). The issuer 108 may approve or deny the transaction. If the issuer 108 approves the transaction, the issuer 108 may notify the acquirer 106 of the approval. The acquirer 106 may then notify the merchant 104 of the approval of the transaction, who may then finalize the transaction with the consumer 102. The issuer 108 may then bill the consumer 102 for payment of the transaction.

Figure 2:
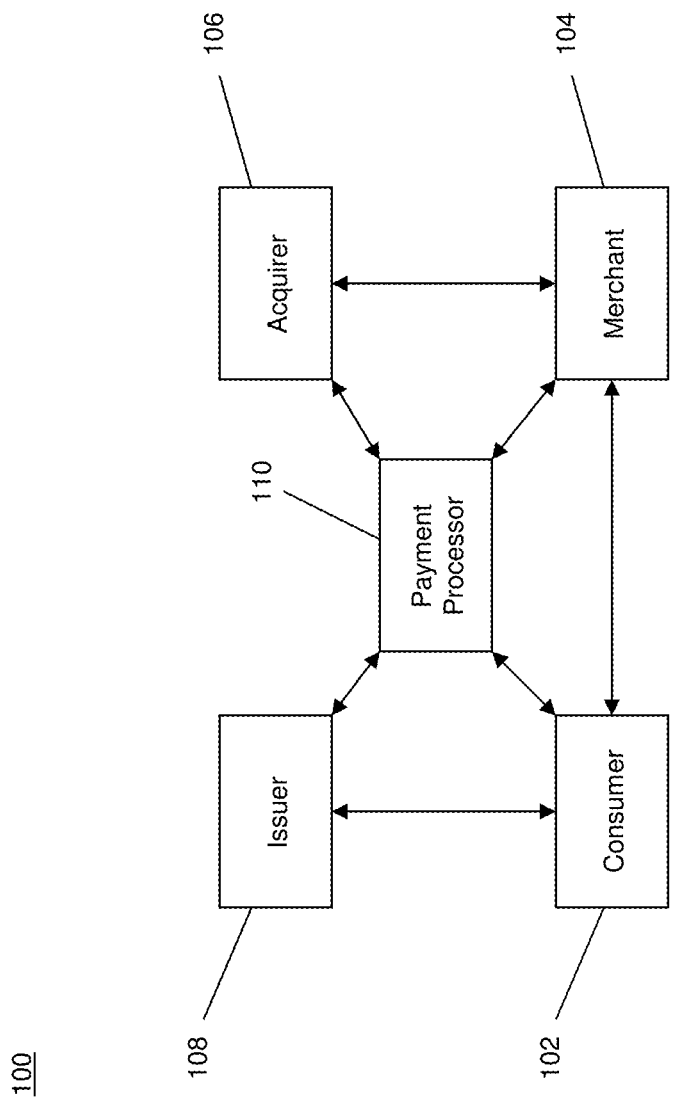
FIG. 2 is a block diagram illustrating a system for processing payment card transactions using a payment processor in accordance with exemplary embodiments.

In an exemplary embodiment, the system 100 may also include a payment processor 110 (illustrated in FIG. 2). The payment processor 110 may process the payment card transaction on behalf of the acquirer 106 and/or the issuer 108. The payment processor 110 may be any service provider for merchants, acquirers, issuers, consumers, etc. for the processing transactions involving payment cards, such as MasterCard, VISA, American Express, etc. The payment processor 110 may charge a fee to the merchant 104 for the processing of the financial transaction (e.g., processing money across traditional payment rails, as defined below). The fee may be a per-transaction fee, a set fee, a variable fee, or any other fee scheme suitable for the processing of financial transactions.

Figure 3:
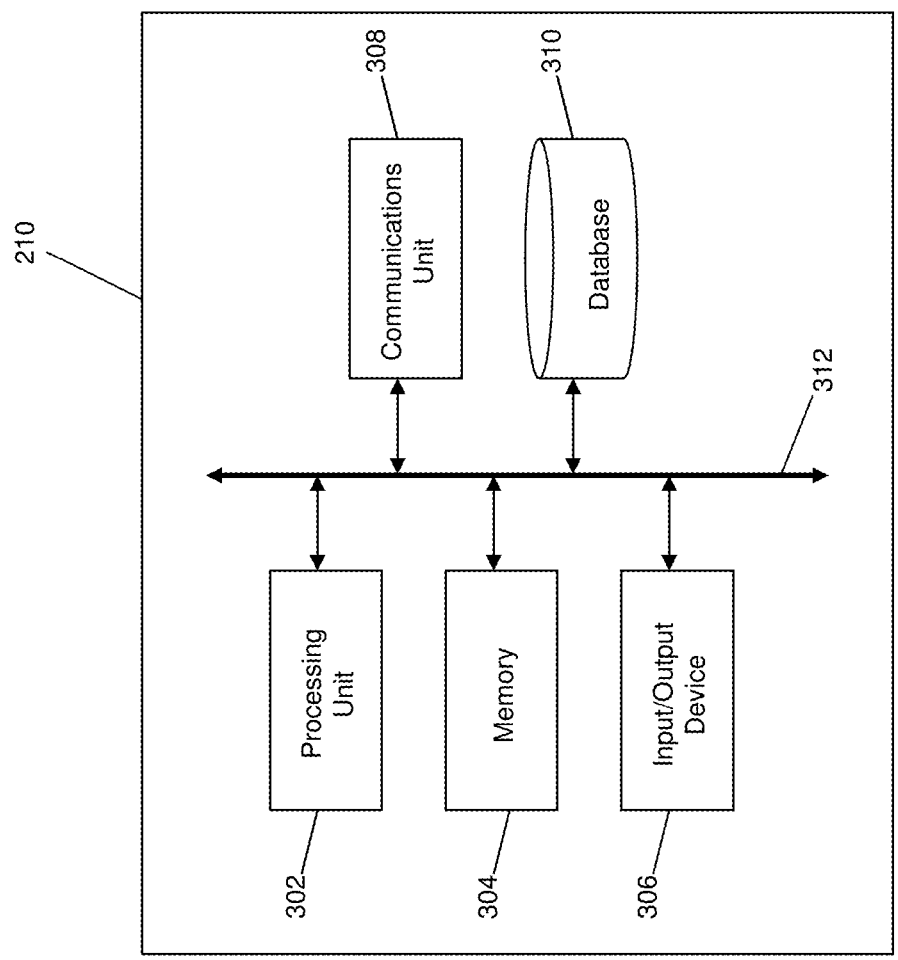
FIG. 3 is a block diagram illustrating a payment processing server configured to process financial accounts in accordance with exemplary embodiments.

FIG. 3 illustrates a block diagram of a payment processing server 210, which may be configured to perform as the payment processor 110. The payment processing server 210 may be a single server, or may include a plurality of servers networked together (e.g., physically, such as by a coaxial cable, or wirelessly, such as through a local area network). Components of the payment processing server may be connected via a bus 312, types of which will be apparent to persons having skill in the relevant art. The payment processing server 210 may include a processing unit 302. The processing unit 302 may be any processor configured to perform the functions disclosed herein, such as a single central processing unit (CPU) or multiple CPUs. Suitable types and configurations of processing units will be apparent to persons having skill in the relevant art.

The payment processing server 210 may also include a memory 304. The memory 304 may be a random access memory (RAM), a read-only memory (ROM), or a combination thereof. The memory 304 may store a program that may cause the processing unit 302 to perform functions as disclosed herein. The payment processing server 210 may also include an input/output (I/O) unit 306. The I/O unit 306 may transmit or receive information, such as an authorization request or a reply to an authorization request (e.g., to the acquirer 106). The I/O unit 306 may communicate with entities outside of the payment processor 110 (e.g., the issuer 108) by utilizing a communications unit 308. The communications unit 308 may be configured to facilitate communication through a network, such as network 116, discussed in more detail below.

The payment processing server 210 may also include a database 310. The database 310 may be included as part of the payment processing server 210 or may be external to the payment processing server 210 and accessed via a network (e.g., the network 116). The database 310 may be a single database, or be comprised of multiple databases, which may be internal to the payment processing server 210 or external and accessed via a network, or a combination thereof.

Data may be stored on any type of suitable computer readable media, such as optical storage (e.g., a compact disc, digital versatile disc, Blu-ray disc, etc.) or magnetic tape storage (e.g., a hard disk drive). The database 310 may be configured in any type of suitable database configuration, such as a relational database, a structured query language (SQL) database, a distributed database, an object database, etc. Suitable configurations and storage of the databases will be apparent to persons having skill in the relevant art.

The database 310 may be configured to store a plurality of accounts, including a consumer account and a plurality of merchant accounts. The consumer account may be associated with a consumer (e.g., the consumer 102). At least one of the plurality of merchant accounts may be associated with a merchant (e.g., the merchant 104). At least one account of the plurality of accounts may include an amount of virtual currency, as discussed below, associated with the account. In one embodiment, each account of the plurality of accounts includes an associated amount of virtual currency.

In some embodiments, the consumer account associated with the consumer 102 may also be associated with a payment card (e.g., the payment card used in the financial transaction), or other accounts associated with the consumer (e.g., additional payment cards, checking accounts, savings accounts, etc.). In one embodiment, the consumer 102 may select a preferred payment card or other account to be used by the payment processor 110 when processing financial transactions including the consumer 102.

Processing Financial Accounts and Micropayment Transactions

Due to the expenses incurred with processing financial transactions across traditional payment rails (e.g., Automated Clearing House (ACH), wire transfers, etc.), payment processors (e.g., the payment processor 110) may charge fees, such as to the merchant 104 or the merchant's acquiring bank (e.g., the acquirer 106), for each transaction processed. In some instances, the fee for processing a financial transaction may rival or even be greater than the value of the product. For micropayment transactions, financial transactions of amounts that are small (e.g., fractions of a standard unit of currency, such as transactions less than a U.S. dollar, for 3-5 cents, or even fractions of cents), the added expense of processing fees may cause the merchant 104 to lose a significant amount of revenue when payment cards are used to pay for micropayment transactions. The present payment technical solution, however, is not limited to micropayments, but rather, offers the possibility of a universal virtual currency for transactions of potentially any size or value. It, in essence, offers a universal virtual currency.

A universal virtual currency (UVC) may provide an opportunity for minimizing processing fees, while maintaining existing payment and processing structures. The use of a universal virtual currency may limit the amount of real currency that is moved across traditional payment rails and thus reduce processing cost. In an exemplary embodiment, the universal virtual currency may be used in financial transactions with limited, if any, modification to existing hardware and software of the consumer 102 and the merchant 104.

Figure 4:
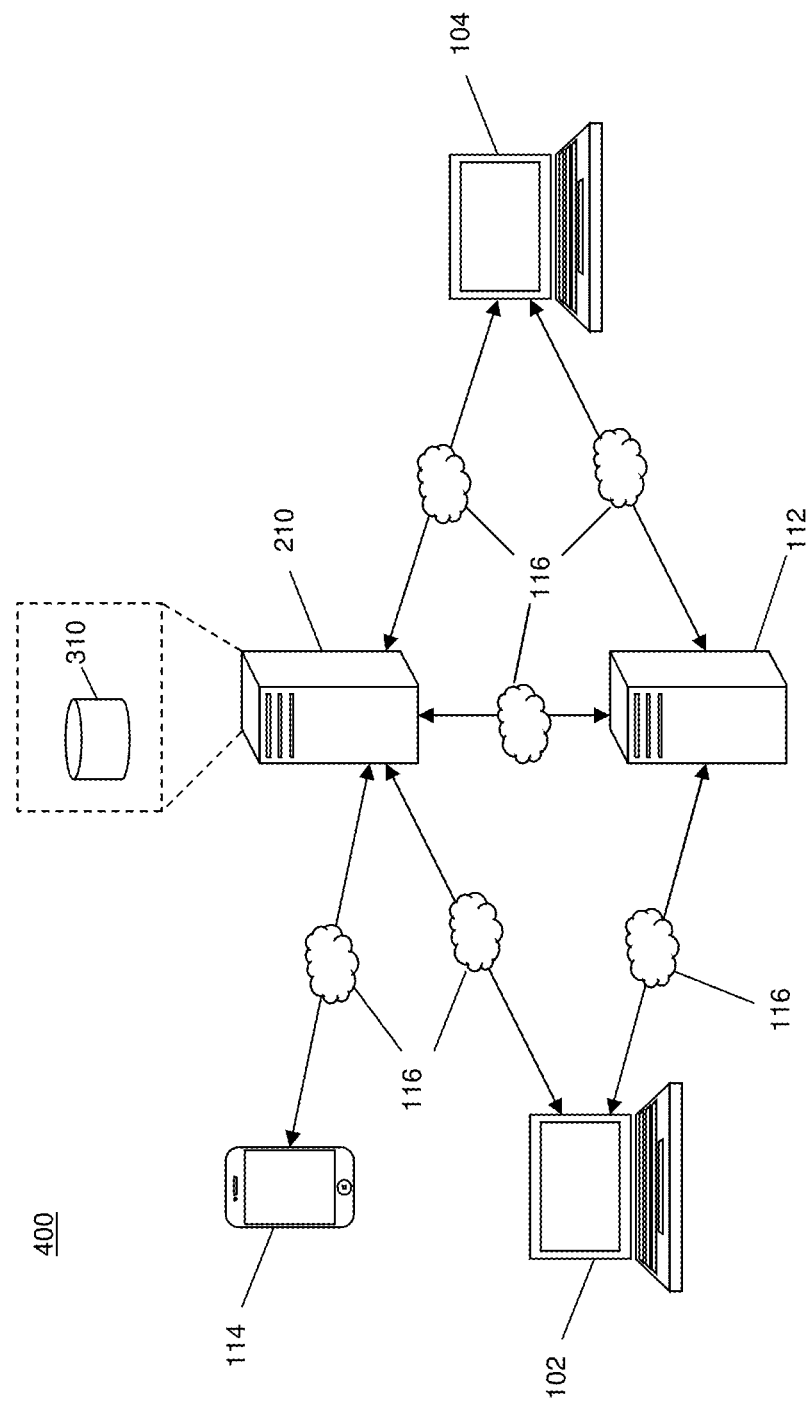
FIG. 4 is a block diagram illustrating an exemplary system for processing financial accounts in accordance with exemplary embodiments.

FIG. 4 illustrates a system 400 for processing financial accounts and micropayment transactions utilizing a universal virtual currency. The system 400 may include the consumer 102, who may use a device (e.g., a personal computer, a mobile communication device, etc.) to navigate to a webpage of the merchant 104, which may be hosted on or accessed through a web server 112. The web server 112 may communicate with the consumer 102 and/or the merchant 104 through a network 116. Network configurations that may be suitable for performing the functions as disclosed herein may include a local area network (LAN), a wireless area network (WAN), WiFi, coaxial cable, fiber optic, the Internet, infrared, radio frequency, combinations thereof, or other configurations that will be apparent to persons having skill in the relevant art.

The consumer 102 may initiate a financial transaction with the merchant 104 (e.g., through the web server 112). The financial transaction may be a micropayment transaction. In an exemplary embodiment, the micropayment transaction is for an amount of universal virtual currency (e.g., 5 UVC or "bubbles"). In one example, the corresponding amount of corresponding real currency is less than the processing fee required for a payment processor (e.g., the payment processor 110) to process the financial transaction. When the consumer 102 initiates the financial transaction with the merchant 104, the web server 112 may communicate with the payment processing server 210 to carry out the transaction. In one embodiment, the web server 112 may transmit transaction data (e.g., consumer information, merchant information, transaction details, transaction amount, etc.) to the payment processing server 210. In one embodiment, the transaction data may be transmitted pursuant to the International Organization for Standardization's ISO 8583 standard.

The payment processing server 210 may process the micropayment transaction using universal virtual currency. In an exemplary embodiment, the payment processing server 210 may process the transaction without using traditional payment rails. The payment processing server 210 may identify a consumer account in the database 310 associated with the consumer 102, and a merchant account in the database 310 associated with the merchant 104. The consumer account and the merchant account may include an amount of universal virtual currency associated with each account.

The payment processing server 210 may process the micropayment transaction by transferring an amount of UVC equal to the amount of the transaction from the consumer account to the merchant account. In an exemplary embodiment, the payment processing server 210 does not process any amount of real currency. In one embodiment, the processing of the transaction does not use any traditional payment rails.

In one embodiment, the payment processing server may process the micropayment transaction based on rules or guidelines defined by a corresponding processing rule. The processing rule may be included in a plurality of processing rules, which may be stored in the database 310. The plurality of processing rules may each define rules or guidelines for processing the corresponding financial transaction. For example, there may be different processing rules for each merchant, for each consumer, for transactions that require currency exchange, based on the transaction amount, based on the location of the merchant and/or the consumer, etc. Rules or guidelines defined by processing rules may include rules for approving the transaction, for denying the transaction, rules or guidelines for adjusting the value of universal virtual currency in the associated account or accounts, rules for performing currency exchanges, or any other rule or guideline for processing a financial transaction as will be apparent to persons having skill in the relevant art.

The payment processing server 210 may notify the web server 112, the merchant 104, or the consumer 102 of the success or failure (e.g., if the consumer account does not contain enough UVC) of the micropayment transaction. If the micropayment transaction processing is complete, the merchant 104 and/or the web server 112 may finalize the transaction. In one embodiment, the payment processing server 210 may notify the consumer 102 of the transaction on a consumer device 114 associated with the consumer 102, such as a mobile communication device (e.g., a cell phone, smart phone, tablet computer, etc.). In another embodiment, the payment processing server 210 may transmit an electronic mail message (e-mail) to an e-mail account associated with the consumer (e.g., and stored in the database 310 and associated with the consumer account).

In an exemplary embodiment, the universal virtual currency may be accepted by a plurality of merchants (e.g., associated with the plurality of merchant accounts stored in the database 310). Managing of UVC account information by the payment processor 110 may result in less expense and resources necessary by the plurality of merchants (e.g., the merchant 104) in utilizing the universal virtual currency. In some embodiments, the universal virtual currency may be used in existing transaction systems.

The payment processing server 210 may also be configured to process financial accounts (e.g., stored in the database 310), such as the consumer account associated with the consumer 102 or the merchant account associated with the merchant 104. The payment processing server 210 may process a financial account by converting an amount of universal virtual currency associated with the financial account to real currency. In an exemplary embodiment, the universal virtual currency may be converted to real currency only when the account meets a predetermined criteria.

In one embodiment, the predetermined criteria may be set by the consumer or merchant associated with the account. In another embodiment, the predetermined criteria may be set by the payment processor 110, or by the merchant's acquiring bank (e.g., the acquirer 106) or the consumer's issuing bank (e.g., the issuer 108). In one embodiment, the predetermined criteria may be that the corresponding amount of real currency is of a minimum amount. In a further embodiment, the minimum amount of real currency is the fee for processing (e.g., transferring) the real currency to the consumer or merchant associated with the account. In another embodiment, the predetermined criteria may be time-based (e.g., universal virtual currency is automatically converted to real currency and distributed to the account holder on the first of every month).

In some embodiments, the converted real currency may be associated with the same financial account. In other embodiments, the converted real currency may be associated with a different financial account (e.g., still associated with the consumer or merchant). In some instances, the holder of the account of the universal virtual currency may elect a destination account for the real currency (e.g., a checking account, a payment card account, etc.).

Processing financial accounts may also include converting real currency into universal virtual currency. For example, the payment processing server 210 may be configured to process a purchase by the consumer 102 for a specified amount of virtual currency for a corresponding amount of real currency. In some embodiments, the consumer 102 may be required to spend a minimum amount of real currency. In a further embodiment, the minimum amount of real currency may be at least the fee for processing the transaction. In some embodiments, the consumer may select a purchasing method (e.g., from an account with the payment processor 110, a payment card, a checking account, etc.).

Micropayment Transaction Processing Flow

Figure 5A:
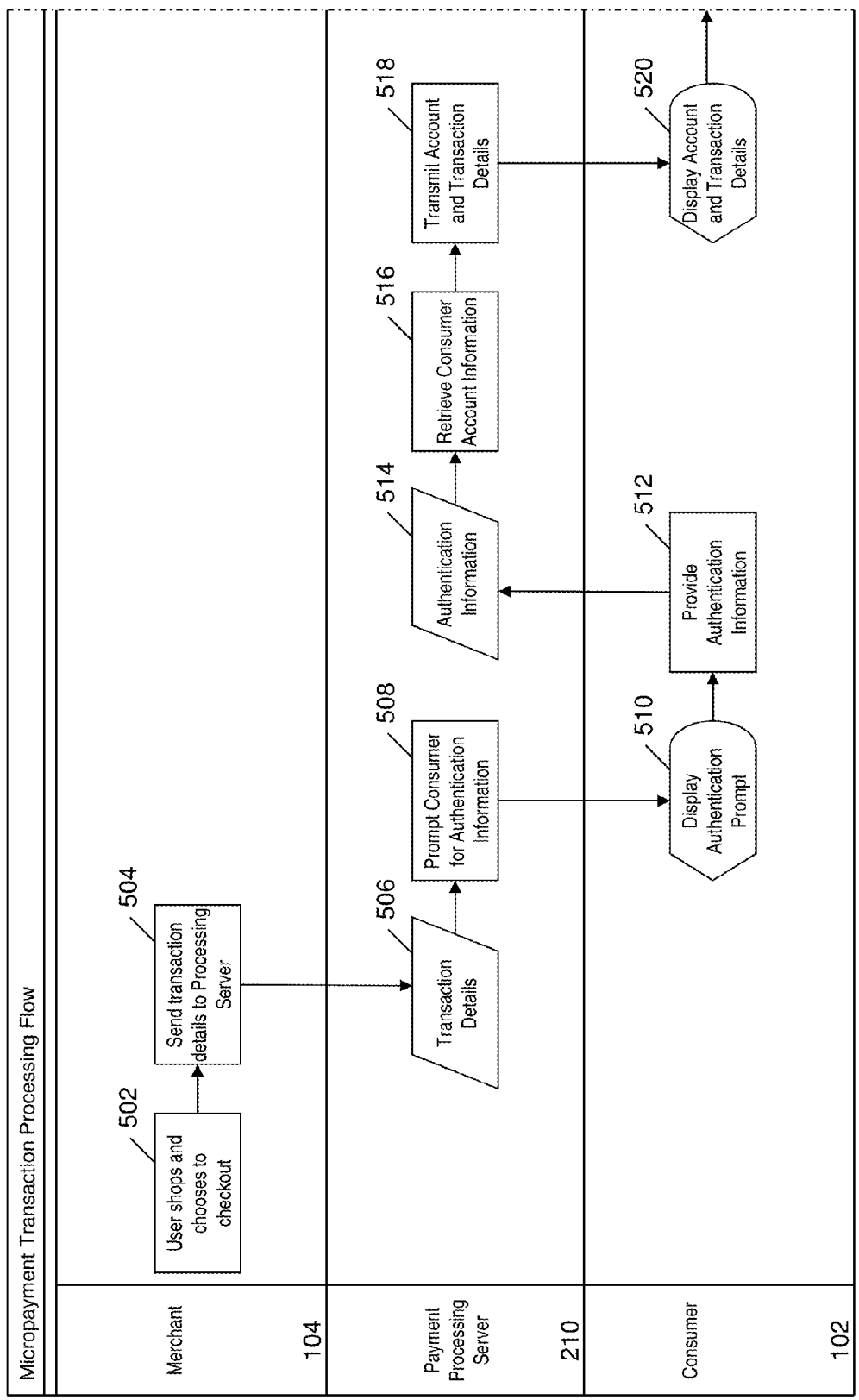
FIGS. 5A and 5B are flow diagrams illustrating a process for processing financial transaction using a universal virtual currency in accordance with exemplary embodiments.
Figure 5B:
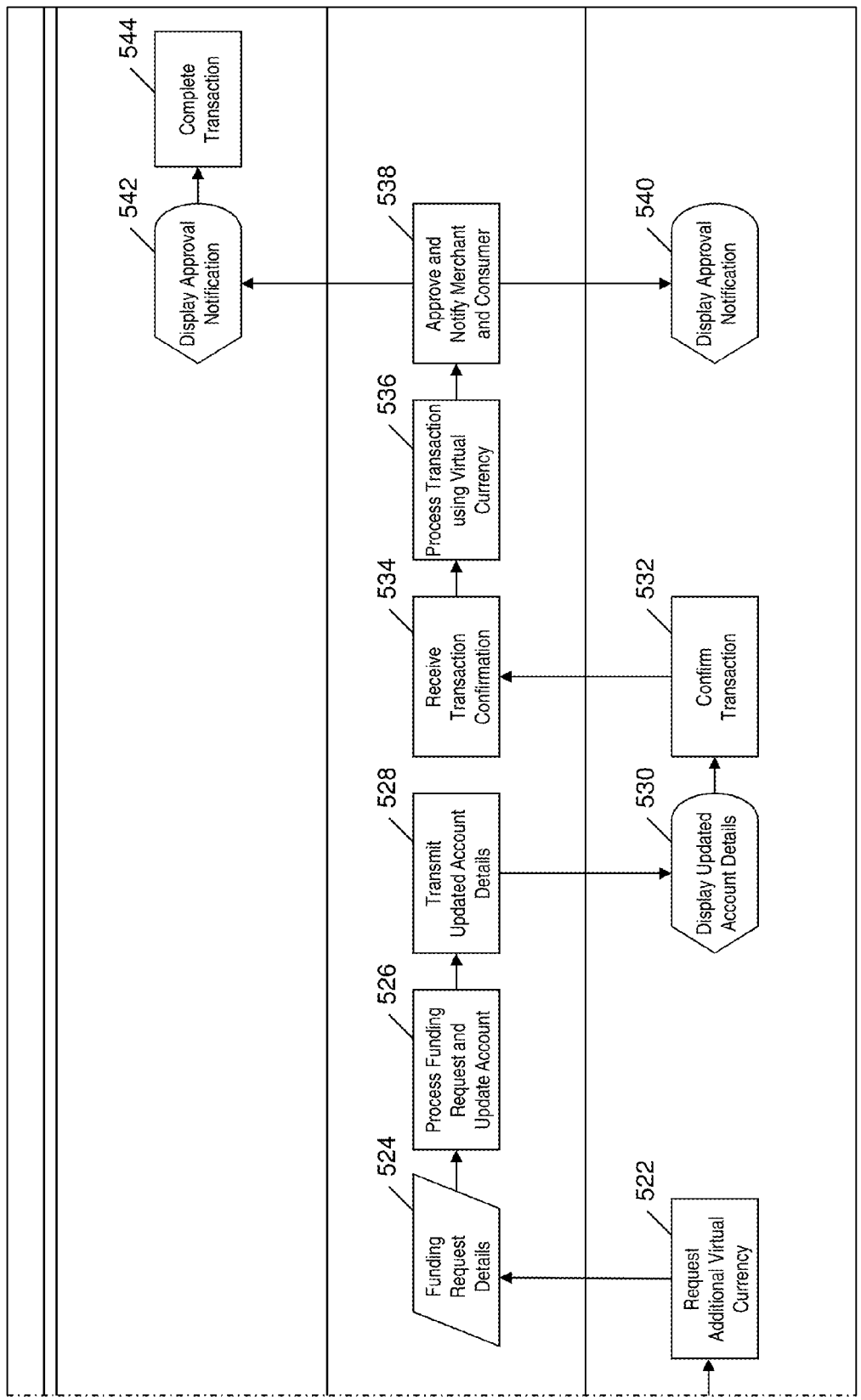

FIGS. 5A and 5B illustrate an exemplary processing flow for processing a micropayment transaction using a universal virtual currency.

In step 502, a user (e.g., the consumer 102) may shop with the merchant 102 (e.g., on a website of the merchant 104 or at a physical location of the merchant 104) and choose to checkout. In step 504, the merchant 104 may send transaction details to the payment processing server 210, which may receive (e.g., and store, such as in the database 310) the transaction details in step 506. The transaction details may include merchant identifying information, consumer identifying information, and a transaction amount. In one embodiment, the transaction data may be transmitted pursuant to the International Organization for Standardization's ISO 8583 standard.

In step 508, the payment processing server 210 may prompt the consumer 102 for authentication information. Authentication information may include an e-mail address, a username, a password, a personal identification number, or any other information necessary to validate the identity of the consumer 102. The prompt for information may be displayed to the consumer in step 510. In one embodiment, the prompt for information may be displayed using the medium in which the consumer 102 is engaging in the transaction (e.g., on the computer the consumer 102 used to visit the webpage of the merchant 104). In another embodiment, the prompt for information may be displayed on a device associated with the consumer (e.g., the consumer device 114).

In step 512, the consumer 102 may provide the authentication information to the payment processing server 210, which, in step 514, may receive the authentication information. The payment processing server 210 may use the received authentication information to retrieve account information associated with the consumer 102 (e.g., and stored in the database 310). The account information may include an amount of universal virtual currency associated with the consumer 102, financial account information, funding sources, etc. In step 518, the payment processing server 210 may transmit account and transaction details, such as the merchant name, transaction amount, and amount of universal virtual currency associated with the consumer 102, to the consumer 102. In some embodiments, the transmitted details may also include a funding source previously identified by the consumer 102. In step 520, the received account and transaction details may be displayed to the consumer 102.

In step 522, the consumer 102 may request additional virtual currency to fund their account from the payment processing server 210. In one embodiment, the request for additional virtual currency may include a universal currency amount, a real currency amount, or a funding source. The payment processing server 210 may receive the funding request details in step 524, and, in step 526, process the funding request and update the account associated with the consumer 102 (e.g., by increasing the amount of associated universal virtual currency) upon completion of the processing. In step 528, the updated account details may be transmitted by the payment processing server 210 to the consumer 102, which may display the updated account details in step 530. It will be apparent to persons having skill in the relevant art that steps 522-530 may be optional. For example, if the consumer 102 has an adequate amount of universal virtual currency in their account, it may not be necessary to purchase additional universal virtual currency.

In step 532, the consumer 102 may confirm the transaction. The payment processing server 210 may receive the confirmation in step 534, and, in step 536, may process the transaction using universal virtual currency. Processing the transaction may include transferring an amount of universal virtual currency (e.g., the transaction amount) from an account associated with the consumer 102 to an account associated with the merchant 104. In step 538, the payment processing server 210 may approve the transaction and notify the merchant 104 and the consumer 102. The approval may be displayed to the consumer 102 (e.g., on the client device 114) in step 540. In step 542, the approval may be displayed to the merchant 104, and, in step 544, the merchant 104 may complete the transaction.

Exemplary Graphical User Interface for Micropayment Transactions

Figure 6A:
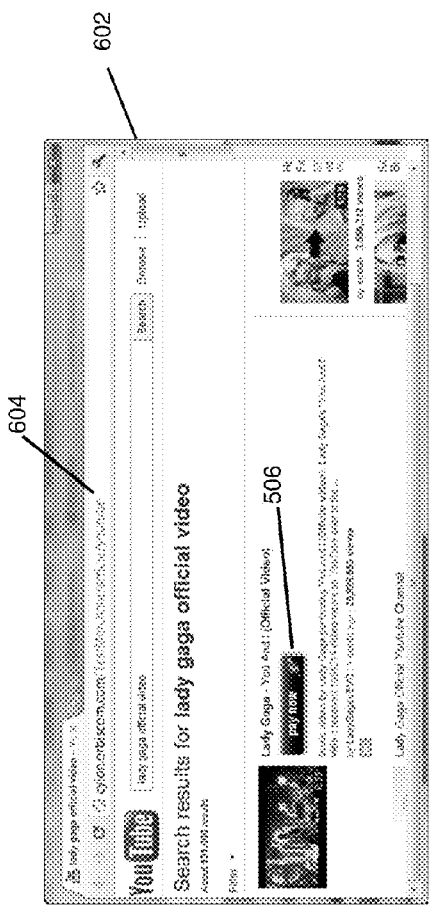
FIGS. 6A-6C are illustrations of a graphical user interface for engaging in a micropayment transaction processed by the system of FIG. 3, in accordance with exemplary embodiments.
Figure 6C:
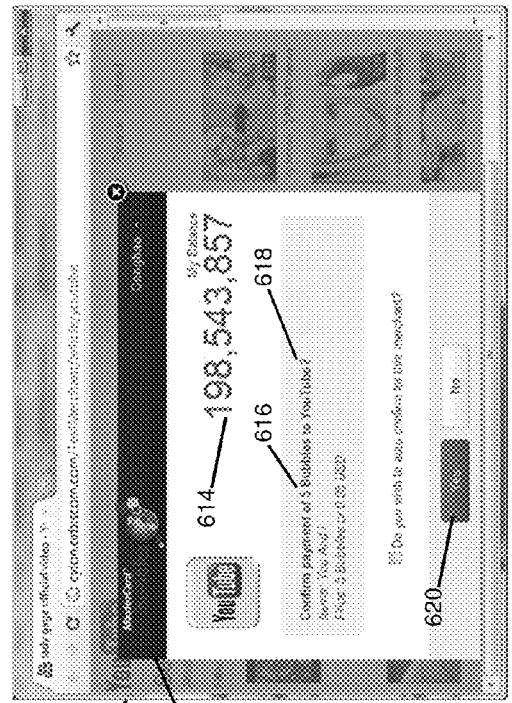
Figure 6B:
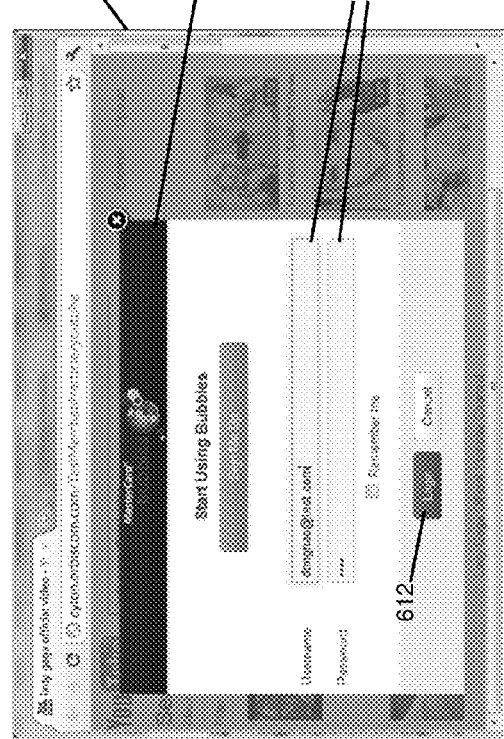

FIGS. 6A-6C illustrate a graphical user interface for a consumer (e.g., the consumer 102) engaging in a micropayment transaction.

In FIG. 6A, the consumer 102 may navigate to a webpage 602, which may be accessed through a web server (e.g., the web server 112). The webpage may be owned or maintained by a merchant (e.g., the merchant 104). The consumer 102 may be presented with goods or services for purchasing. A good or service that is available may be accompanied by a method of initiating a financial transaction for the good or service, such as the "pay now" button 606. The consumer 102 may interact with the "pay now" button 606 to initiate the micropayment transaction.

Upon interacting with the button 606, the consumer 102 may be presented with a transaction window 608 (as illustrated in FIG. 6B). The consumer may be required to submit information to identify the consumer, such as authentication information 610. The authentication information 610 may be any information necessary for the payment processor 110 to identify the consumer account associated with the consumer 102. In an exemplary embodiment, the authentication information may also include a password or other information (e.g., a personal identification number) for the purposes of account and consumer security. In one embodiment, the consumer 102 may also provide information specific to the merchant 104, such as loyalty program or rewards information.

When the consumer 102 has furnished the proper information, the consumer 102 may interact with a login button 612. The authentication information may be submitted to the web server 112, who may authenticate the user as the consumer 102 (e.g., by communicating with or providing the information to the payment processor 110). If the authentication fails, the user may be notified of the failure (e.g., in the transaction window 608).

FIG. 6C illustrates the transaction window 608 which may be presented to the consumer 102 if authentication is successful. The consumer 102 may be provided with information that may be useful in proceeding with the micropayment transaction. For example, the consumer 102 may be presented with an account balance 614, indicating the amount of universal virtual currency currently associated with the consumer account associated with the consumer 102. The transaction window 608 may also include a transaction amount 516, indicating the amount of universal virtual currency the consumer 102 must pay to complete the transaction (e.g., 5 UVC, or "bubbles", as illustrated in FIG. 6C).

In one embodiment, the transaction amount 616 may indicate discounts or promotions applied to the expense of the transaction (e.g., due to a loyalty program, coupon, etc.). The transaction window 608 may further include payee information 618, which may indicate the merchant associated with the merchant account. In some instances, the payee information 618 may include the merchant 104. If the consumer 102 wishes to complete the financial transaction, the consumer 102 may interact with the "yes" button 618, which may initiate processing of the micropayment transaction (e.g., with the web server 112 and/or the payment processor 110).

The payment processor 110 may process the micropayment transaction, as described above. The payment processor 110 may notify the consumer 102 of the authorization or denial of the transaction. In one embodiment, the consumer 102 may be notified in the transaction window 608. In another embodiment, the consumer 102 may be sent an e-mail message by the payment processor 110 or a third party. In an exemplary embodiment, the consumer 102 may be notified by a transmission (e.g., a notification via short message service message, e-mail, automated or live voice mail or call, pop-up, etc.) to the consumer device 114 associated with the consumer 102.

Figure 7:
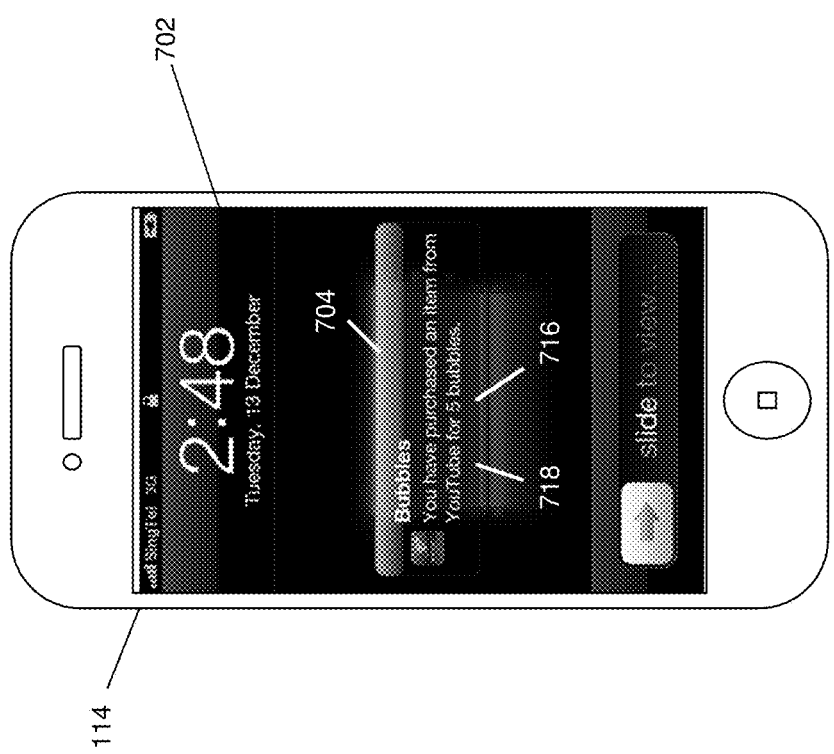
FIG. 7 is an illustration of a graphical user interface for providing consumer notification of a micropayment transaction in accordance with exemplary embodiments.

FIG. 7 illustrates a graphical user interface of the consumer device 114 when receiving a notification of a successful micropayment transaction (e.g., from the payment processor 110). The consumer device 114 may include a display 702, such as a light emitting diode (LED) display, a liquid crystal display (LCD), a capacitive touch display, or any other type of display as will be apparent to persons having skill in the relevant art. The display 702 may be display a notification window 704. The notification window 704 may include any information suitable for notifying the consumer 102 of the micropayment transaction. For example, the notification window 704 may include the transaction amount 616 or the payee information 618.

Processing of Person-to-Person or Peer-to-Peer Transactions

Figure 8:
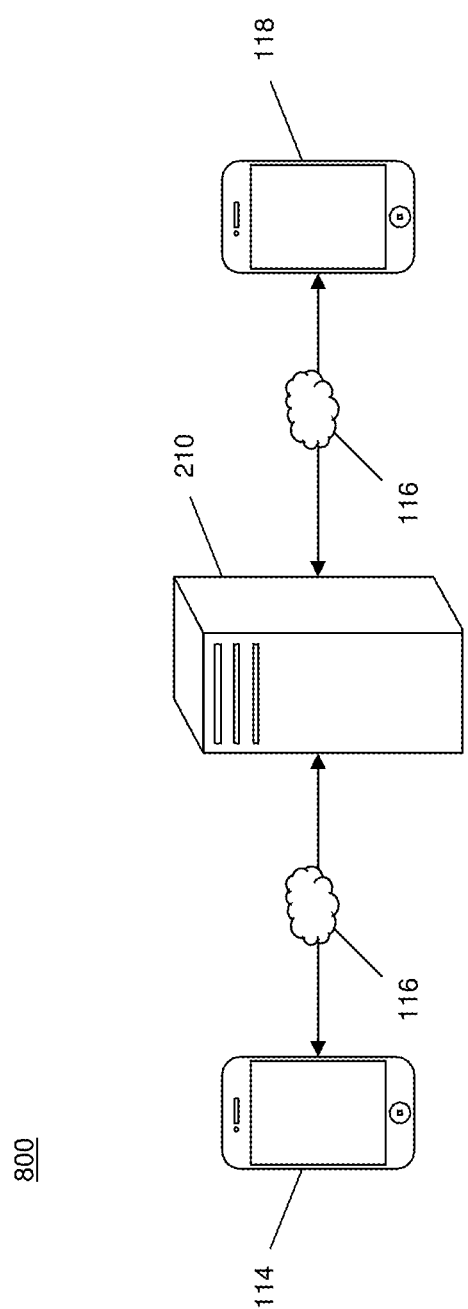
FIG. 8 is a block diagram illustrating an exemplary system for processing financial accounts in a consumer-to-consumer transaction in accordance with exemplary embodiments.

The payment processor 110 may also be configured (e.g., through the processing server 210) to process peer-to-peer (e.g., person-to-person) transactions, such as transactions for the request or transfer of universal virtual currency between two consumers. FIG. 8 illustrates a system 800 for the processing of a universal virtual currency transfer from the consumer 102 to a second consumer.

The consumer 102 may use the consumer device 114 (e.g., a smartphone) to initiate a request for universal virtual currency. The consumer 102 may input transaction information, such as a name or unique identifier of the second consumer, a transaction amount, or description of the request, into the consumer device 114. The information may be transmitted (e.g., through the network 116) to the payment processing sever 210. The payment processing server 210 may relay the request to the second consumer via a second consumer device 118 (e.g., a smartphone).

The second consumer may accept or deny the request using the second consumer device 118. If the second consumer accepts the request, the payment processing server 210 may process the request by transferring the transaction amount of universal virtual currency from a consumer account associated with the second consumer (e.g., and stored in the database 310) to a consumer account associated with the consumer 102. The payment processing server 210 may notify the consumer 102 and the second consumer via the devices associated with each consumer of the results of the processing (e.g., by transmitting a notification as illustrated in FIG. 7).

In another embodiment, the consumer 102 may initiate a transfer of universal virtual currency using the consumer device 114. The consumer 102 may provide information, such as a unique identifier of the second consumer, transaction amount, and description, which may be transmitted to the payment processing server 210. The payment processing server 210 may process the transfer and notify the consumer 102 (e.g., through the consumer device 114) and/or the second consumer (e.g., through the second consumer device 118). In an exemplary embodiment, the transfer may be processed without using traditional payment rails.

FIGS. 9A-9D illustrate an exemplary graphical user interface for engaging in a financial transaction for the transfer of universal virtual currency from a first consumer (e.g., the consumer 102) to a second consumer.

Figure 9:
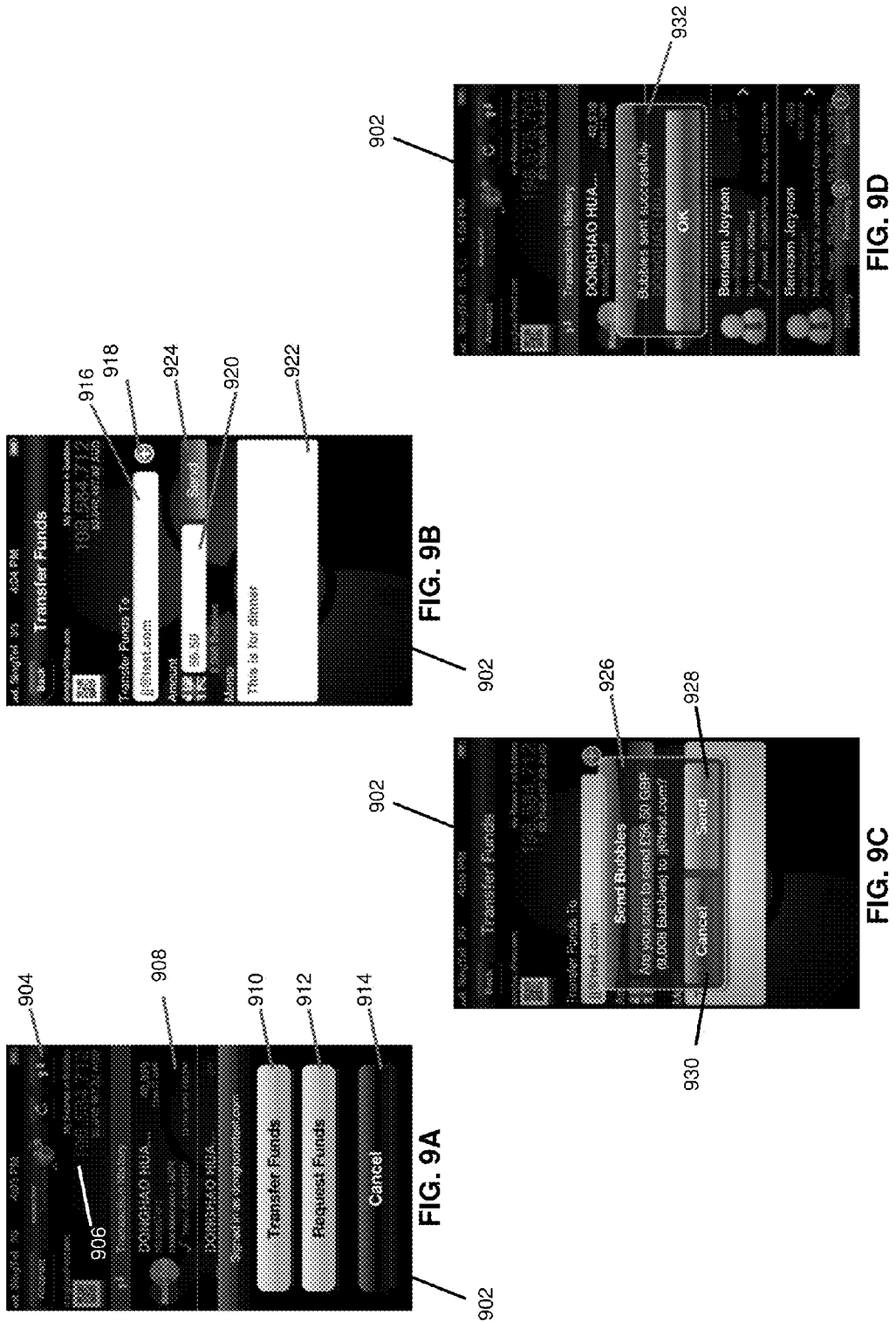
FIGS. 9A-9D are illustrations of a graphical user interface for transferring or receiving virtual currency processed by the system of FIG. 3, in accordance with exemplary embodiments.

FIG. 9A depicts an interface for an application program, which may be run on a device, such as a mobile communication device (e.g., the consumer device 114). The application program may display an application window 902 (e.g., on the display 702). The application window 902 may display a transaction history 908, which may include a history of financial transactions associated with the user (e.g., the consumer 102). In one embodiment, the transaction history 908 may include only universal virtual currency transactions.

The application window 902 may also include a transfer button 904. Upon user interaction with the transfer button 904, the application window 902 may present a transfer button 910, a request button 912, and a cancel button 914. User interaction with the cancel button 914 may remove the buttons 910, 912, and 914 from the application window (e.g., and only display the transaction history 908). Interaction with the request button 912 may display a screen requesting input of information for the request of universal virtual currency with a second consumer.

Interaction with the transfer button 910 may display the input screen illustrated in FIG. 9B. In FIG. 9B, the application window 902 may display an input screen for the user (e.g., the consumer 102) to provide additional information for a transfer of universal virtual currency. For example, the user may provide a payee identifier 916 (e.g., a unique identification of the intended recipient) and a transfer amount 920. In some embodiments, the user may provide a memo 922 with the transfer. The memo 922 may be a personal note for user, or in some embodiments, may also be a useful note to the recipient when the funds are received (such as explaining that the transfer is to repay a debt owed to the recipient).

The application window 902 may also include an addition button 916, which may allow the user to input unique identifiers for additional payee. This capability may be useful if the user wishes to transfer universal virtual currency to multiple accounts or consumers at the same time. The user may interact with a send button 924 in order to initiate processing of the transfer. Information (e.g., entered by the user in the application window 902) may be transmitted to the payment processing server 210, which may process the transfer of funds by methods disclosed herein. In an exemplary embodiment, the transfer may be processed without using traditional payment rails.

In some embodiments, the user may be required to provide confirmation of the transfer, such as in confirmation window 926 illustrated in FIG. 9C. In the confirmation window 926, the user may be able to confirm the transfer and initiate processing by interacting with the send button 928, or may cancel the transfer by interacting with cancel button 930 (e.g., and returned to the input screen illustrated in FIG. 9B). After processing by the payment processing server 210 has been completed, the application window 902 may display a notification 932 of the completed transfer, as illustrated in FIG. 9D.

Currency Exchanging

The payment processing server 210 may also be configured to process the exchanging of a first real currency to or from the universal virtual currency, or from the first real currency to or from a second real currency by using the universal virtual currency. The exchanging of real currency using a universal virtual currency may provide consumers with better control over fluctuations in exchange rates, and may provide consumers with a more stable centralized currency to or from which other currencies may be freely exchanged.

Figure 10:
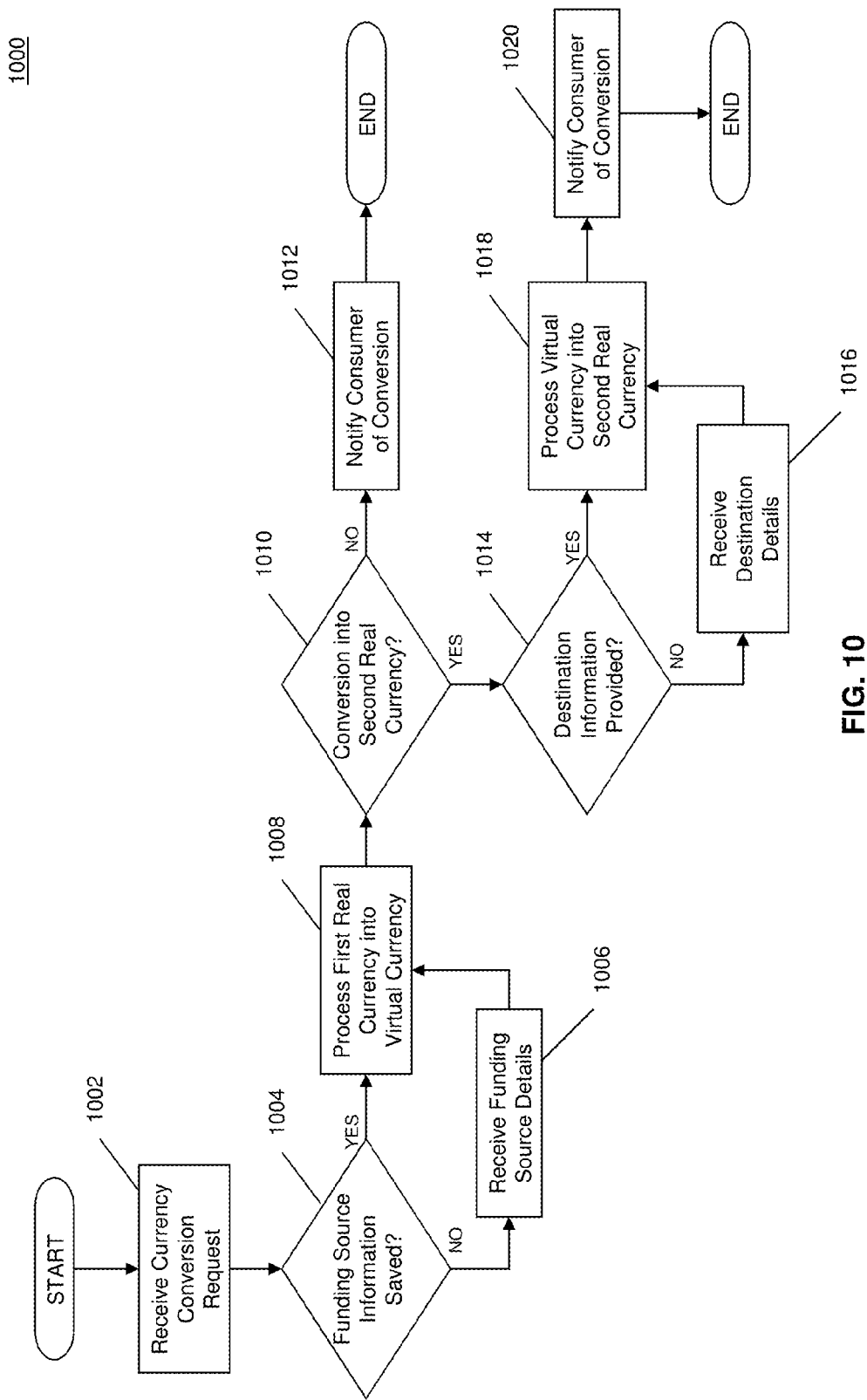
FIGS. 10 and 11 are flowcharts illustrating an exemplary method for processing financial accounts in accordance with exemplary embodiments.

FIG. 10 illustrates a method 1000 for processing a currency exchange from a real currency into a universal currency, and further into a second real currency.

In step 1002, a processing server (e.g., the payment processing server 210) may receive a currency conversion request (e.g., from the consumer 102, the merchant 104, etc.). The currency conversion request may include an amount of universal virtual currency to be obtained, an amount of first real currency for conversion, or an amount of second real currency to be obtained. In some embodiments, the payment processing server 210 may require a minimum amount of first real currency, universal virtual currency, or second real currency (e.g., due to the fees of processing real currency). In step 1004, the payment processing server 210 may identify if funding source information is saved (e.g., in a profile associated with the requester, such as a profile stored in the database 310). Funding source information may include a payment card (e.g., a credit card), a checking account, or other funding source to be used to charge (e.g., for the amount of real currency identified) for the currency exchange. In some instances, the currency conversion request may include a funding source, which the payment processing server 210 may save in a profile associated with the requester, at the requester's consent.

If funding information is not available, or if funding information may be incomplete, then, in step 1006, the payment processing server 210 may request and receiving funding source details (e.g., from the requester, an issuing bank, etc.). Once funding information has been received or is otherwise available to the payment processing server 210, then the payment processing server 210 may process the first real currency into the universal virtual currency in step 1008. Processing the real currency into universal virtual currency may include processing the funding source for an amount of first real currency to be converted into universal virtual currency, and associating the corresponding amount of universal virtual currency with the profile associated with the requester. The payment processing server 210 may use a defined currency exchange rate for the conversion of the first real currency into universal virtual currency.

In some embodiments, the currency exchange rate may be a predefined rate (e.g., 1 U.S. dollar is always worth 100 UVC). In other embodiments, the currency exchange rate may be a fluctuating rate (e.g., based on international markets, currency value, etc.). Methods for determining the value of currency and ideal currency exchange rates will be apparent to persons having skill in the relevant art. The currency exchange rate may be calculated on a regular basis (e.g., daily, weekly, hourly, etc.) or may be calculated in real-time at the time of the requested currency conversion. In one embodiment, the currency exchange rate may be dependent on the amount of real currency being exchanged for universal virtual currency.

In step 1010, the payment processing server 210 determines if the exchanged universal virtual currency is to be converted into a second real currency. In some instances, the determination may be based on information included in the currency conversion request. In other instances, the payment processing server 210 may query the requester to determine if further conversion is requested (e.g., as part of the same conversion transaction). If no further conversion is requested, then, in step 1012, the payment processing server 210 may notify the requester (e.g., the consumer 102) of the conversion. For example, the consumer 102 may receive a short messaging service (SMS) message or a notification on the consumer device 114 (e.g., as illustrated in FIG. 7). Information included in the notification may include, the approval or denial of the conversion transaction, the amount of real currency exchanged, the amount of universal virtual currency obtained, and the total amount of universal virtual currency associated with the consumer 102.

If a further conversion of the universal virtual currency into a second real currency is requested, then, in step 1014, the payment processing server 210 may identify if destination information (e.g., an account for the deposit of the second real currency, such as a checking account) has been provided. In some instances, destination account information may be previously saved (e.g., in a profile associated with the consumer 102 and stored in the database 310). In other instances, the destination account information may be included in the original conversion request, or in a response to a query prompted to the consumer 102 in step 1010. If no destination account information has been provided, then the payment processing server 210 may request and receive the information from the consumer 102 in step 1016.

In step 1018, the payment processing server 210 may process the exchange of the universal virtual currency into the second real currency. A currency exchange rate may be used in determining the amount of second real currency to be obtained for the exchange of the universal virtual currency. The currency exchange rate may be based on the considerations discussed above. Further, the currency exchange rate may be based on an exchange of the universal virtual currency to the second real currency or may be based on an exchange of the first real currency to the second real currency, which may result in a different obtained amount of second real currency.

After the second currency exchange has been processed, the payment processing server 210 may, in step 1020, notify the consumer 102 of the conversion (e.g., through a notification on the consumer device 114). The notification may include the approval or denial of the conversion transaction, the amount of first real currency exchanged and the amount of second real currency obtained. The notification may also include the amount of universal virtual currency that was obtained and subsequently converted as part of the conversion transaction.

In addition to exchanging real currency into universal virtual currency or a second real currency, universal virtual currency may be exchanged into real currency. The exchange of universal virtual currency into real currency may include, for example, step 1002 and steps 1010-1020 of the method 1000. In some instances, the payment processing server 210 may perform automatic conversions of universal virtual currency to real currency. For example, a merchant (e.g., the merchant 104) may request that its balance of universal virtual currency be converted to real currency and distributed to a financial account at the beginning of every month.

Exemplary Method for Processing Financial Accounts

Figure 11:
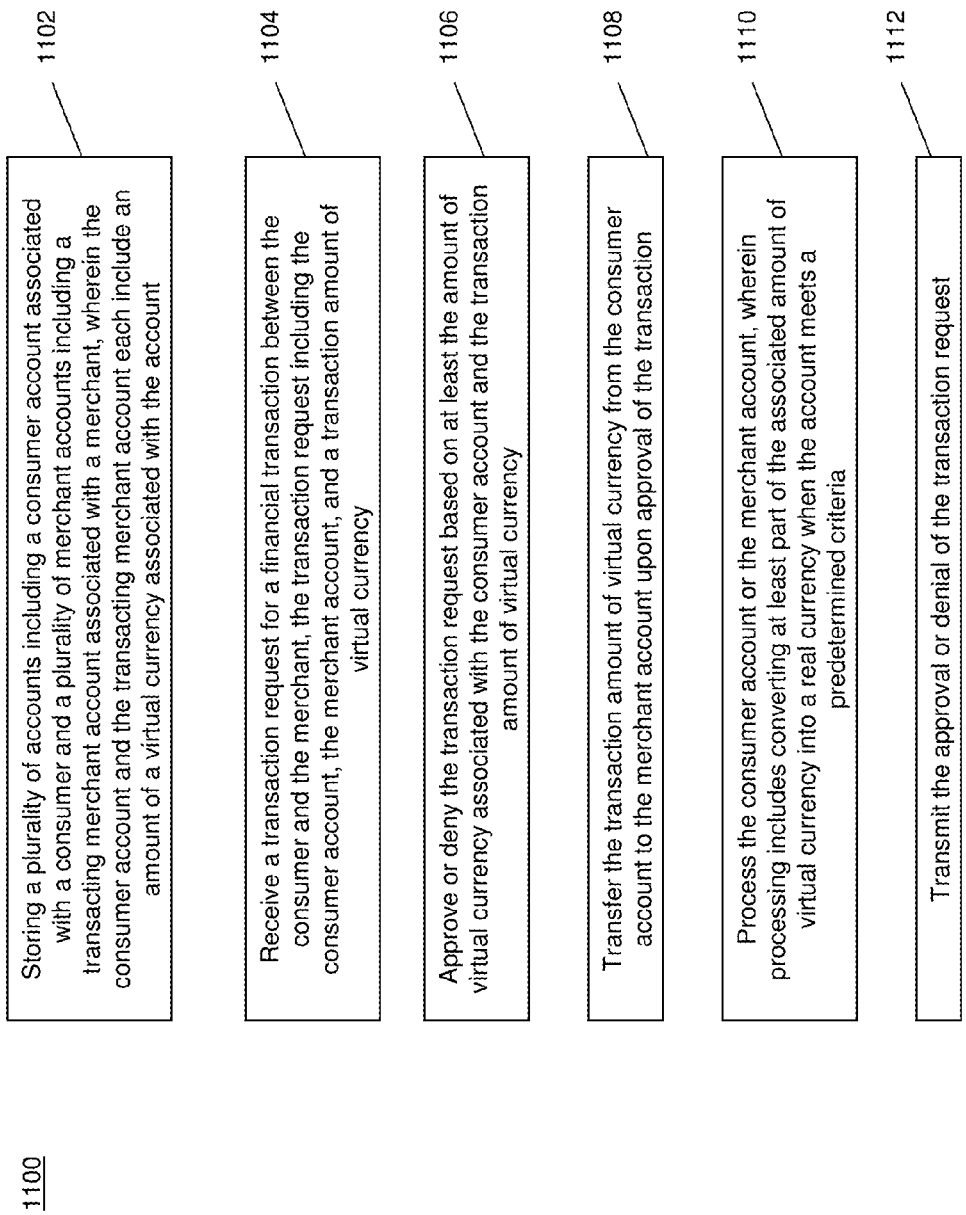

FIG. 11 is a flowchart illustrating an exemplary method 1100 for processing financial accounts, including facilitating transactions using a universal virtual currency.

In step 1102, a plurality of accounts are stored (e.g., in the database 310) including a consumer account associated with a consumer (e.g., the consumer 102) and a plurality of merchant accounts, including a transacting merchant account associated with a merchant (e.g., the merchant 104). At least one account of the plurality of accounts may include an amount of virtual currency associated with the account. In some embodiments, a consumer or merchant may be associated with multiple accounts (e.g., one account per payment card or other funding source). In a further embodiment, each consumer or merchant may be assigned a unique identifier (e.g., a unique identification number).

In step 1104, a transaction request is received (e.g., by the communications unit 308 of the payment processing server 210 on behalf of the payment processor 110), the transaction request being for a financial transaction between the consumer and the merchant, the transaction request including the consumer account, the merchant account, and a transaction amount of virtual currency. In one embodiment, the consumer account may include a unique identifier (e.g., an account number) of an account corresponding to the consumer. In one embodiment, the transaction data may be transmitted pursuant to the International Organization for Standardization's (IOS) ISO 8583 standard or a similar, suitable standard for communication transaction information.

In step 1106, a processor (e.g., the processing unit 302 of the payment processing server 210) may approve or deny the transaction request based on at least the amount of virtual currency associated with the consumer account and the transaction amount of virtual currency. In some embodiments, the financial transaction may be denied if the value of virtual currency associated with the consumer account is less than the transaction amount of the transaction. In one embodiment, the approval or denial of the transaction request may also be based on at least one of: consumer information, merchant information, an exchange rate, location of the transaction, and time and/or date of the transaction.

In step 1108, the processing unit 302 may transfer the transaction amount of virtual currency from the consumer account to the merchant account upon approval of the transaction. In an exemplary embodiment, the transfer may not use traditional payment rails. In a further embodiment, traditional payments rails may include Automated Clearing House (ACH) and wire transfer. In some embodiments, the consumer and/or the merchant may be notified of completion of the transfer of the virtual currency.

In step 1110, the processing unit 302 may process the consumer account or the merchant account, wherein processing includes converting at least part of the associated amount of virtual currency into a real currency when the account meets a predetermined criteria. In one embodiment, the predetermined criteria may be set by a user associated with the account. In another embodiment, the predetermined criteria may be set by the processor (e.g., the payment processor 110). In yet another embodiment, the predetermined criteria may be a request from a user associated with the account. In one embodiment, the predetermined criteria may be when the associated amount of virtual currency corresponds to a minimum amount of the real currency. In a further embodiment, the minimum amount of real currency may be the amount of real currency required to process the financial transaction. In some embodiments, a unit of the real currency may correspond to a plurality of units of the virtual currency. In an exemplary embodiment, the predetermined criteria may be unrelated to the financial transaction. In one embodiment, the converting step may be performed using traditional payment rails.

In step 1112, the approval or denial of the transaction request may be transmitted (e.g., by the communications unit 308 of the payment processing server 210). In some embodiments, the transmission of the approval or denial of the transaction request may be performed pursuant to an IOS standard. In one embodiment, the approval or denial may also include additional information, such as the transaction amount, a time and/or date of the transaction, or the updated value of associated virtual currency for the consumer and/or the merchant. It will be apparent to persons having skill in the relevant art that step 1112 may be performed prior to or concurrently with step 1110.

Exemplary Method for Processing Financial Transactions

Figure 12:
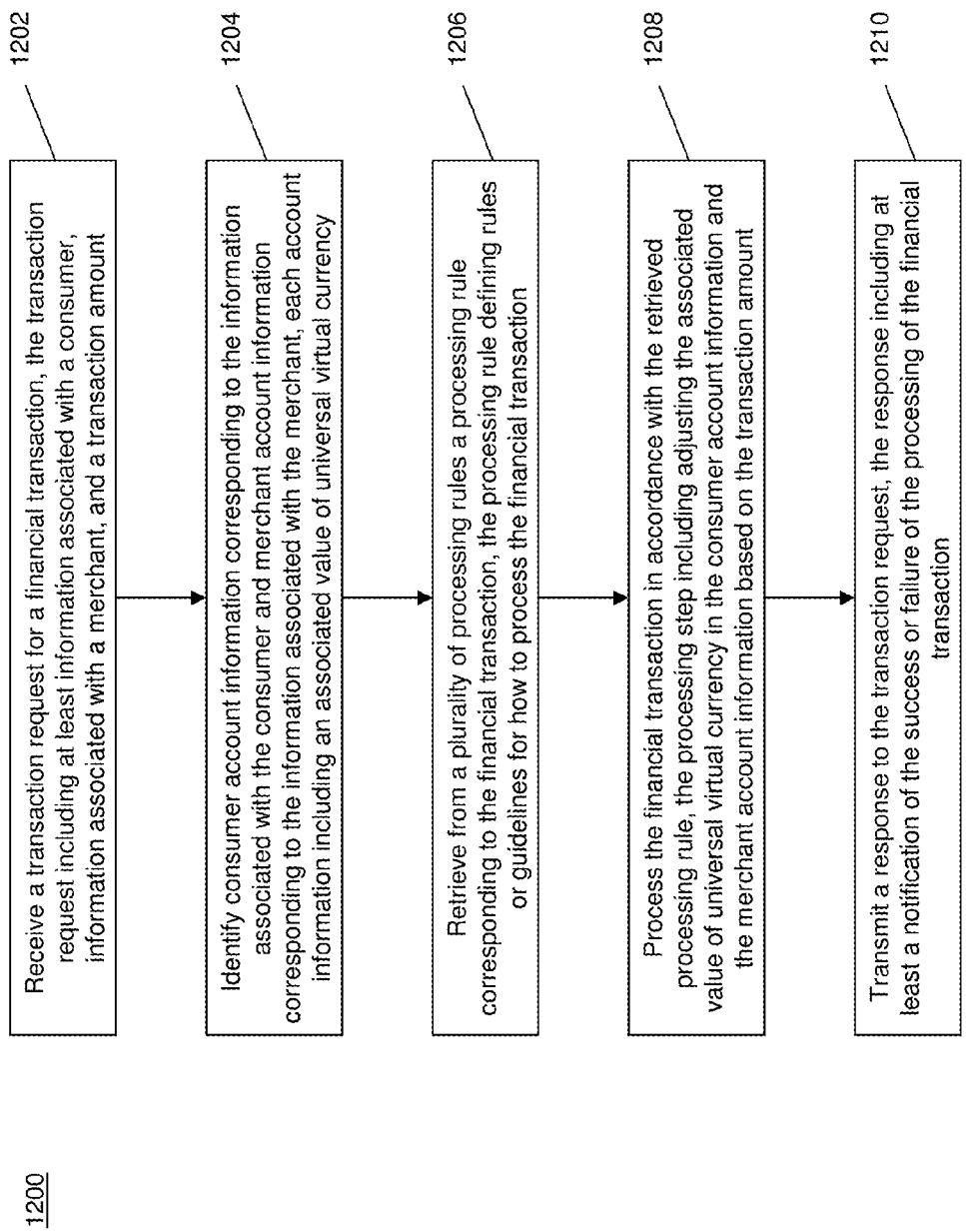
FIG. 12 is a flowchart illustrating an exemplary method for processing financial transactions in accordance with exemplary embodiments.

FIG. 12 illustrates an exemplary method 1200 for processing financial transactions using a universal virtual currency.

In step 1202, a transaction request for a financial institution may be received (e.g., by the communications unit 308 of the payment processing server 210). The transaction request may include at least information associated with a consumer, information associated with a merchant, and a transaction amount. In one embodiment, the information associated with a consumer may include a unique identifier for the consumer, such as an account number associated with the consumer. In an exemplary embodiment, the transaction amount may be a specific value of universal virtual currency.

In step 1204, a processing unit (e.g., the processing unit 302 of the payment processing server 210) may identify (e.g., in a database, such as the database 310) consumer account information corresponding to the information associated with the consumer and merchant account information corresponding to the information associated with the merchant, with each account information including an associated value of universal virtual currency. Then, in step 1206, the processing unit 302 may retrieve from a plurality of processing rules a processing rule corresponding to the financial transaction, the processing rule defining rules or guidelines for how to process the financial transaction. In some embodiments, rules or guidelines may include rules or guidelines for authorizing a transaction, declining a transaction, calculating transaction amounts, calculating exchange rates, how or if notice should be provided to any entities, or any other rules or guidelines for processing financial transactions as discussed herein.

In step 1208, the processing unit 302 may process the financial transaction in accordance with the retrieved processing rule, the processing step including adjusting the associated value of universal virtual currency in the consumer account information and the merchant account information based on the transaction amount. In an exemplary embodiment, the processing step will not be performed using traditional payment rails. In one embodiment, the adjusting the associated value of universal virtual currency may be further based on a currency exchange rate defined by the processing rule.

In step 1210, a response to the transaction request may be transmitted (e.g., by the communications unit 308 of the payment processing server 210), the response including at least a notification of the success or failure of the processing of the financial transaction. In one embodiment, the response may also include at least one of the resulting value of universal currency associated with the consumer account information or the merchant account information, a time and/or date of the financial transaction, the location of the transaction, or the transaction amount.

In some embodiments, the method 1200 may further include steps for processing a consumer account. The communications unit 308 may receive an exchange request, the exchange request including at least the information associated with the consumer, a real currency, an exchange value, and account routing information. In one embodiment, the information associated with the consumer may include a unique account identifier associated with the consumer, such as an account number. The processing unit 302 may retrieve a rate of exchange, the rate of exchange defining an amount of the universal virtual currency corresponding to an amount of the real currency. In one embodiment, the rate of exchange may be defined by the processing rule.

The processing unit 302 may also processing the exchange request. Processing the exchange request may include identifying exchange amounts of the universal virtual currency and the real currency by applying the rate of exchange to the exchange value, adjusting the associated value of universal virtual currency in the consumer account information based on the exchange amount of the universal virtual currency, and transmitting the exchange amount of real currency to a financial account based on the received account routing information. In one embodiment, transmitting the exchange amount of real currency to a financial account may include transmitting the real currency through traditional payment rails. In a further embodiment, the traditional payment rails may include ACH transfer or wire transfer.

Techniques consistent with the present disclosure provide, among other features, systems and methods for distributing content to devices, initiating financial transactions, processing electronic financial transactions using a payer device and pay codes, and indirectly controlling websites. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A system for processing virtual currency transactions, comprising:
   a database configured to store a plurality of accounts, the plurality of accounts including a consumer account associated with a consumer and a plurality of merchant accounts including a transacting merchant account associated with a merchant, wherein the consumer account and the transacting merchant account each include an amount of virtual currency associated with the account;
   a receiving device configured to receive a transaction request for a financial transaction between the consumer and the merchant, the transaction request including the consumer account, the merchant account, and a transaction amount of virtual currency;
   a processor configured to
      approve or deny the transaction request based on at least the amount of virtual currency associated with the consumer account and the transaction amount of virtual currency,
      transfer the transaction amount of virtual currency from the consumer account to the merchant account upon approval of the transaction,
      and process the consumer account or the merchant account, wherein the processing includes converting at least part of the associated amount of virtual currency into a real currency when the account meets a predetermined criteria; and
   a transmitting device configured to transmit the approval or denial of the transaction request.

2. The system of claim 1, wherein the predetermined criteria includes a request from a user associated with the account.

3. The system of claim 1, wherein the predetermined criteria includes when the associated amount of virtual currency corresponds to a minimum amount of the real currency.

4. The system of claim 1, wherein the financial transaction is an ultra-micropayment transaction.

5. The system of claim 1, wherein a unit of the real currency corresponds to a plurality of units of the virtual currency.

6. The system of claim 1, wherein processing the financial transaction further includes using non-traditional payment rails.

7. A method for processing financial accounts, comprising:
   storing, in a database, of a processing device, a plurality of accounts, the plurality of accounts including a consumer account associated with a consumer and a plurality of merchant accounts including a transacting merchant account associated with a merchant, wherein the consumer account and the transacting merchant account each include an amount of virtual currency associated with the account;
   receiving, by a receiving device, a transaction request for a financial transaction between the consumer and the merchant, the transaction request including the consumer account, the merchant account, and a transaction amount of virtual currency;
   approving or denying, by the processing device, the transaction request based on at least the amount of virtual currency associated with the consumer account and the transaction amount of virtual currency;
   transferring, by the processing device, the transaction amount of virtual currency from the consumer account to the merchant account upon approval of the transaction;
   processing, by the processing device, the consumer account or the merchant account, wherein the processing includes converting at least part of the associated amount of virtual currency into a real currency when the account meets a predetermined criteria; and
   transmitting, by the processing device, the approval or denial of the transaction request.

8. The method of claim 7, wherein the predetermined criteria includes a request from a user associated with the account.

9. The method of claim 7, wherein the predetermined criteria includes when the associated amount of virtual currency corresponds to a minimum amount of the real currency.

10. The method of claim 7, wherein the financial transaction is an ultra-micropayment transaction.

11. The method of claim 7, wherein a unit of the real currency corresponds to a plurality of units of the virtual currency.

12. The method of claim 7, wherein processing the financial transaction further includes using non-traditional payment rails.

13. A system for processing financial transaction using a universal virtual currency, comprising:
   a receiver configured to receive a transaction request for a financial transaction, the transaction request including at least information associated with a consumer, information associated with a merchant, and a transaction amount;
   a database configured to store account information including consumer account information corresponding to the consumer and merchant account information corresponding to the merchant, each account information including an associated value of a universal virtual currency;
   a database configured to store at least one processing rule defining rules or guidelines for how to process the financial transaction;
   a processor configured to process the financial transaction in accordance with the at least one processing rule, wherein processing the financial transaction includes adjusting the associated value of universal virtual currency in the consumer account information and the merchant account information based on the transaction amount; and
   a transmitting component configured to transmit a response to the transaction request, the response including at least a notification of success or failure of the processing of the financial transaction,
   wherein the universal virtual currency can be exchanged for real currency.

14. The system of claim 13, wherein
   the receiver is further configured to receive an exchange request, the exchange request including at least the information associated with the consumer, a real currency, an exchange value, and account routing information;
   the processor is further configured to
      retrieve a rate of exchange, the rate of exchange defining an amount of the universal virtual currency corresponding to an amount of the real currency, identify exchange amounts of the universal virtual currency and the real currency by applying the rate of exchange to the exchange value, adjusting the associated value of universal virtual currency in the consumer account information based on the exchange amount of the universal virtual currency; and the system further comprises a transmitter configured to transmit the exchange amount of the real currency to a financial account based on the received account routing information.

15. The system of claim 14, wherein the real currency is transmitted on traditional payment rails.

16. The system of claim 13, wherein the processor is further configured to process the financial transaction using non-traditional payment rails.

17. The system of claim 13, wherein the information associated with the consumer is a unique account identifier.

18. A method for processing financial transactions using a universal virtual currency, comprising:

receiving, by a communication component in a transaction system, a transaction request for a financial transaction, the transaction request including at least information associated with a consumer, information associated with a merchant, and a transaction amount;

identifying, from a database of account information in the transaction system, consumer account information corresponding to the information associated with the consumer and merchant account information corresponding to the information associated with the merchant, each account information including an associated value of universal virtual currency;

retrieving from a plurality of processing rules a processing rule corresponding to the financial transaction, the processing rule defining rules or guidelines for how to process the financial transaction;

processing, by a processor in the transaction system, the financial transaction in accordance with the retrieved processing rule, the processing step including adjusting the associated value of universal virtual currency in the consumer account information and the merchant account information based on the transaction amount; and transmitting, by the communication component, a response to the transaction request, the response including at least a notification of the success or failure of the processing of the financial transaction, wherein the universal virtual currency can be exchanged for real currency.

19. The method of claim 18, further comprising:

receiving, by the communication component, an exchange request, the exchange request including at least the information associated with the consumer, a real currency, an exchange value, and account routing information;

identifying, from the database, the consumer account information;

retrieving a rate of exchange, the rate of exchange defining an amount of the universal virtual currency corresponding to an amount of the real currency; and processing, by a processor, the exchange request, the processing step comprising:

identifying exchange amounts of the universal virtual currency and the real currency by applying the rate of exchange to the exchange value;

adjusting the associated value of universal virtual currency in the consumer account information based on the exchange amount of the universal virtual currency; and transmitting the exchange amount of the real currency to a financial account based on the received account routing information.

20. The method of claim 19, wherein the real currency is transmitting on traditional payment rails.

21. The method of claim 18, wherein processing the financial transaction further includes using non-traditional payment rails.

22. The method of claim 18, wherein the information associated with the consumer is a unique account identifier.

\* \* \* \* \*